United States Patent [19]

Yamamoto et al.

[11] Patent Number: 5,560,977
[45] Date of Patent: Oct. 1, 1996

[54] MAGNETIC RECORDING MEDIUM AND MANUFACTURING THE SAME

[75] Inventors: Yuzo Yamamoto; Atsushi Ishikawa; Michihide Yamauchi, all of Tochigi-ken, Japan

[73] Assignee: Kao Corporation, Tokyo, Japan

[21] Appl. No.: 259,994

[22] Filed: Jun. 17, 1994

[30] Foreign Application Priority Data

Jun. 18, 1993 [JP] Japan .................... 5-147174

[51] Int. Cl.⁶ .................. G11B 5/66; B32B 3/10; B32B 3/00
[52] U.S. Cl. ............ 428/141; 428/408; 428/65.3; 428/694 T; 428/694 ST; 428/694 SG; 428/900; 427/129; 427/130; 427/131; 360/131; 360/135; 204/192.1; 205/674
[58] Field of Search ............. 428/694 ST, 694 SG, 428/694 T, 65.3, 408, 141, 900; 360/131, 135; 427/129, 130, 131; 204/192.1, 129.1, 129 TS

[56] References Cited

U.S. PATENT DOCUMENTS

| | | | |
|---|---|---|---|
| 4,833,001 | 5/1989 | Kijima | 428/141 |
| 5,119,258 | 6/1992 | Tsai | 360/135 |
| 5,326,607 | 7/1994 | Muramatsu | 428/65.3 |

*Primary Examiner*—Leszek Kiliman
*Attorney, Agent, or Firm*—Oblon, Spivak, McClelland, Maier, & Neustadt, P.C.

[57] ABSTRACT

An object of the present invention is to offer a magnetic recording medium comprising a substrate and a magnetic film formed on the substrate, wherein the substrate is formed using a conductive material and a surface of said substrate is processed by electroetching. As this magnetic recording medium has excellent surface characteristics, excellent durability and small spacing loss, its recording and play back characteristics are excellent.

12 Claims, 1 Drawing Sheet

MAGNETIC RECORDING MEDIUM AND MANUFACTURING THE SAME

BACKGROUND OF THE INVENTION

The present invention relates to a magnetic recording medium.

When considering about reproductive output of a magnetic recording and reproducing system, it is more advantageous that a spacing between a surface of magnetic recording medium and a magnetic head namely gliding height of the magnetic head is smaller. That is, the smaller spacing loss is more advantageous. In other words, it is desirable that the surface of magnetic recording medium is smooth.

Contrary to this, if the surface is too smooth, however, the magnetic head may stick to the surface of the magnetic recording medium at the beginning of running the magnetic recording medium and at the stopping of running the magnetic recording medium. As a result the magnetic recording medium is easily damaged.

The texture processing for forming minute unevenness on a surface of magnetic recording medium is carried out to solve this problem. Now, with improvement of recording density the task for improvement of gliding height of magnetic head becomes a big subject. Therefore, a more and more advanced technical level is demanded for the texture processing. And this texture processing art becomes important for development of a magnetic disk.

By the way a restudy on materials of disk substrate is going on for improving recording density. As a result of this restudy, for an example, a substrate made of glassy carbon is proposed. (pp35 to 38 in the Kobe Steel Technical Report, No4, Vol.39, 1989, Japanese Patent Publication No.63-46004(1988)) As this substrate has excellent characteristics in lightness, smoothness, heat resistance, conductivity, it is paid attention as a substrate that can respond to high density recording.

The development of texture processing art mentioned above, however, is behind. Therefore establishment of this art is desired.

SUMMARY OF THE INVENTION

The first object of the present invention is to offer a magnetic recording medium having excellent surface characteristics and durability.

The second object of the present invention is to offer a magnetic recording medium of which spacing loss is small.

The objects of the present invention are achieved by a magnetic recording medium comprising a substrate and a magnetic film formed on said substrate, wherein said substrate is formed using a conductive material and a surface of said substrate is processed by electroetching.

Moreover, the objects of the present invention are achieved by a method of producing a magnetic recording medium comprising a substrate and a magnetic film formed on said substrate comprising: a first step of electroetching a conductive substrate in an electrolytic solution; and a second step of forming a magnetic film on said substrate after said first step.

A conductive substrate is possible for the substrate of the magnetic recording medium of the present invention. Especially, a substrate of which resistivity is $1\times10^{-2}$ $\Omega$ cm or less is possible. For example, the following substrates are used: a substrate that a non-magnetic metal film such as Ni—P film is coated on the surface of a base substrate consisting of materials such as Al alloy, glass or ceramics and a substrate made of carbon such as glassy carbon. Among them, a substrate made of carbon, especially glass-like carbon, which is surface-polished is desirable. Also, a substrate made of carbon of which density is in the range from 1.4 to 1.6 g/cm$^3$ is preferable. Moreover a substrate made of carbon of which half-width of (002) plane diffraction peak in X-ray diffraction measurement is 3° or more is preferable. Furthermore, the substrate made of carbon of which number of defect greater than 3 μm is less than 1 piece/cm$^2$ is preferable.

It is to be noted that a substrate made of carbon constituted of only carbon materials is possible for the substrate, or a substrate that carbon materials are accumulated by sputtering or vapour deposition on a base formed by materials other than carbon is possible. Moreover, a substrate formed by a composite material containing carbon materials is also possible.

The following can be listed for this carbon materials.
① The carbon materials obtained by carbonizing a heat-cured resin
② The carbon materials obtained by carbonizing a resin which is modified so as to be cured by copolymerization or co-condensation
③ The carbon materials obtained by extremely preventing crystallization in a process of curing or carbonizing.

For the heat-cured resin, phenol resin, epoxy resin, unsaturated polyester resin, ester resin, furan resin, urea resin, melamine resin, alkyd resin, xylene resin can be listed up. These resins can be used as it is, by blended or modified.

The desirable resin is a heat-cured resin that can contain water more than 20 percent by weight in a state of precondensate before cured. Where, "precondensate" means a resin before cured. This is a resin composition of which viscosity has become high by a certain level of addition reaction and/or condensation reaction although it may contain a considerable amount of raw material monomers. The precondensate of heat-cured resin of the present invention can be appropriately designed by selection of raw materials, the blending ratio, copolymerization ratio control and modification. As such heat-cured resins, for example, resins based modified phenol resin proposed in the Japanese Patent Laid-Open No.60-17208(1985), Japanese Patent Laid-Open No.60-171209(1985), Japanese Patent Laid-Open No.60-171210(1985) can be listed up. As the resin that can be modified to a heat-cured resin, the following can be listed up: heat-cured resins such as phenol resin mentioned-above and furan resin, natural materials having high carbonization yield such as asphalt and pitch or hydrophilic materials having comparatively high carbonization yield such as lignin, cellulose, tragacanth gum, gum arabic, fumic acids, and sugers.

The composite material containing carbon materials means a set of composite materials containing the said carbon material and synthetic resin and/or carbon filler. For the synthetic resin, thermoplastic resin such as vinyl chloride resin, polyvinyl acetate resin, polystyrene resin, or heat-cured resin such as phenol resin, epoxy resin, polyester resin, furan resin, urea resin, melamine resin, alkyd resin, xylene resin can be listed up.

In general, by the way, when carrying out electrolysis by connecting a conductive substrate to an anode in an electrolytic solution, phenomena such as electroetching, electropolishing, anodizing arises according to a type of electrolyte or electrolytic conditions. In other words, when anode-electrolyzing a conductive substrate in an electrolytic solution phenomena classified in the following three territories arise in general as shown in FIG. 1. (p.170 in "Electrochemistry of metals" by Takeo Oki, Kyoritsu Shuppan Co., Ltd., 1969)

The territory (A to C) of ①:

When anode electrolysis is carried out, the anode current (I) parabolically increases according to Ohm's law.

The territory (C to D) of ②:

The saturated territory in which the current does not increase even if the electric potential increases.

The territory (D to E) of ③:

The current parabolically increases again when furthermore the electric potential increases.

The phenomenon arising in the each territory is as follows.

①: The electroetching territory

The initial anode dissolution arises and ions eluate into electrolyte. Etched surface is formed because the surface is dissolved from the part that is easy to be dissolved.

②: The electropolishing territory

The dissolution arises or an anodized film is formed. In other words, convexes on the surface are dissolves earlier than the others and the surface is mirrorized.

③: A gas generation and electric discharge territory

Generation of oxygen gas at an anode and electric discharge by destruction of film or through film occur.

For electroetching in the present invention, the territory of ① is limitedly used. The territory of ① can take various forms according to types of processed materials, types of electrolytes and conditions of electrolysis (temperature, distance of electrodes, materials of electrodes, or the like). Therefore, the condition can be selected based on the I-V curve shown in FIG. 1.

The more points on electroetching for carbon materials are not solved than that for metal materials. The said electroetching, electropolishing, electric discharge phenomena according to the electrolysis conditions were confirmed. Electroetching for carbon materials is more difficult than that for metal materials. There is a feature that the surface of carbon substrate is easy to dissolve selectively at electroetching. In other words, there is a feature that a pit is easy to be formed.

When there are voids in a material, fluctuation of composition, scattering of partial electric potential, electroetching goes non-uniformly because current distribution over the surface becomes in non-uniform, by the above-mentioned reason. When an electric current concentrates once, electric resistance of the electrolytic solution goes down due to Joule heat and electric current concentration is promoted. Accordingly, it is desirable to make the carbon material uniform and to remove all defects from the carbon material or to make the size of defects small, when texturing a substrate made of carbon by electroetching. This point has been studied sharply. As a result, it has been found that the carbon material that meets the following conditions is preferable.

① The carbon, especially glassy carbon, of which density is in the range from 1.4 to 1.6 g/cm$^3$.

② The carbon, especially glass-like carbon, of which half-width of (002) plane diffraction peak that appears near 2θ20° to 30° in X-ray diffraction measurement is 3° or more, preferably 4° or more.

③ The carbon, especially glassy carbon, in which number of defect (void or crack) of size greater than 3 μm observed with a polarization microscope or differential microscope is less than 1 piece/cm$^2$.

These conditions have an effect on solubility characteristics of a surface at electroetching. Therefore, the conditions are extremely desirable requirements for obtaining a suitable texture. The case that only one requirement among the above ①, ②, ③ is met is good. Moreover, more preferable case is that one of the combinations of ① and ②, ② and ③, or ② and ③ is met. The most preferable condition is the case that all requirements of ①, ② and ③ are met.

The main feature of the present invention, texturing, is achieved by electroetching a substrate in an electrolytic solution.

The electrolytic solution can be acid or alkaline aqueous solution, and the electrolytic solution of which concentration is in from 0.1 to 100 wt %, preferably in from 1 to 60 wt %, is used. For acids used by the present invention the following are listed up: inorganic acids such as sulfuric acid, hydrochloric acid, nitric acid, phosphoric acid, fluorine acid, perchloric acid and the like; or organic acids such as oxalic acid, formic acid and the like. For alkalis NaOH and KOH are listed up. These can be blended two or more for use. When considering texture efficiency or corrosion of device, it is preferable to use an alkaline aqueous solution. It is also recommended to add an additive agent from the view point of texture efficiency or anticorrosion characteristics.

Pt, Au, Pb and carbon can be used, for example, for anode and cathode materials. For case of texturing a substrate made of carbon, an electrode made of the same carbon materials is preferable.

For a current waveform used, for example, the following are desirable: direct current; alternating current such as single phase alternating current and three-phase alternating current; pulse wave such as rectangular wave and triangle wave; and special waveform such as single phase half wave, two-phase half wave, three-phase half wave, six-phase half wave, single phase full wave, and three-phase full wave. Moreover, these waveforms can be used in combination. From the view point of productivity, three-phase alternating current is desirable. Because texture shape obtained changes if electrolysis waveform is changed, to suitably select and/or combine of current waveforms agreed with desired texture shape is desirable.

For current density at electroetching, it is preferable to be set in the range from 1 to 200 mA/cm$^2$, more preferably 5 to 100 mA/cm$^2$, when considering homogeneity of texture and productivity. In other words, if current density is too low productivity deteriorates. Contrary to this, if current density goes over 200mA/cm$^2$, homogeneity of texture falls.

For voltage at electroetching, it is preferable to be set in the range from 1 to 100 V, more preferably 2 to 50 V, when considering homogeneity of texture and productivity. In other words, if voltage is too low productivity deteriorates because the necessary current density can not be obtained. Contrary to this, if it is too high, homogeneity of etching is difficult to be obtained.

It is to be noted that it is possible to set both the current and the voltage at electroetching constant during all processing period, or to change the voltage so as to be low in the first stage and high in the second stage.

The processing time of electroetching is desirable from 1 second to 1 hour when considering level and homogeneity of texture. More preferably, approximately 5 seconds to 20 minutes. In other words, the desired texture can not be obtained if the time is too short or too long.

The electrolysis temperature is good from 1 to 100° C. Generally it is good room temperature, however, it may be properly selected according to the type of the electrolyte.

In the present invention, the surface of the substrate is dissolved electrochemically and it is turned rough by anode-electrolyzing the substrate with a proper electric potential. As the result a substrate having desired surface is obtained.

In case of carrying out cathode electrolysis, although the surface does not change to rough, the surface characteristics chemically changes. As the result it can be obtained some merits that wettability thereof and so on are improved and adhesion with Cr layer of primary coat increases.

Accordingly both anode electrolysis and cathode electrolysis may be possible because they enable to improve surface characteristics of a substrate of magnetic recording medium. However, it is preferable to adopt anode electrolysis from the view point of texturing. Needless to say, it is also good to arrange to carry out firstly cathode electrolysis and then anode electrolysis.

By the above-mentioned electroetching, the glass-like carbon of which Ra is from approximately 25 to 300Å and Rp/Ra (Ra is center line average surface roughness, Rp is center line surface roughness) is from approximately 2.0 to 6 is obtained. Then a primary coating film such as Cr film of thickness of 500 to 3000Å is provided over the substrate.

A metallic magnetic film is provided on the surface of this primary coating film. For the magnetic film, Co alloy magnetic film made of Co as a main component such as Co—Cr, Co—Cr—X, Co—Ni—X and Co—W—X can be listed up. Where, X represents one, two or more kinds of elements selected from a group of Ta, Pt, Au, Ti, V, Cr, Ni, W, La, Ce, Pr, Nd, Pm, Sm, Eu, Li, Si, B, Ca, As, Y, Zr, Nb, Mo, Ru, Rh, Ag, Sb and Hf. Preferably a Co—Cr—Ta alloy and a Co—Cr—Pt alloy. Thickness of film of magnetic film is generally in the range from 300 to 1000Å.

A protective layer is provided on the surface of magnetic film. As a raw material for the protective layer, the material having high hardness is desirable from the view point of resistance to abrasion. For example, they are oxides, nitrides or carbides of metals such as Al, Si, Ti, Cr, Zr, Nb, Mo, Ta and W. Additionally, carbon or boron nitride are also listed up. Among them, carbon and boron nitride are especially preferable. A protective layer may be formed as single layer or laminated layers with two kinds or more of the above-mentioned materials.

BRIEF DESCRIPTION ON DRAWINGS

EXAMPLE

Example-1 to 23

Substrate material 1

Figure 1:
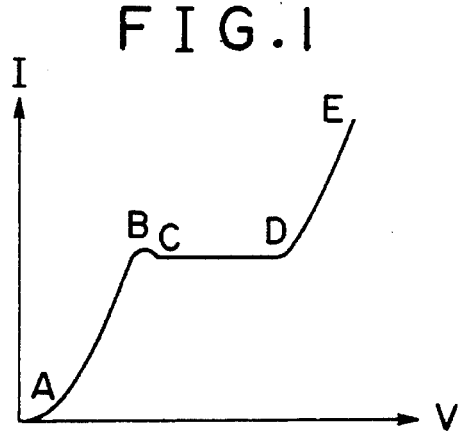
FIG. 1 is a graph showing voltage-current characteristics.
Figure 2:
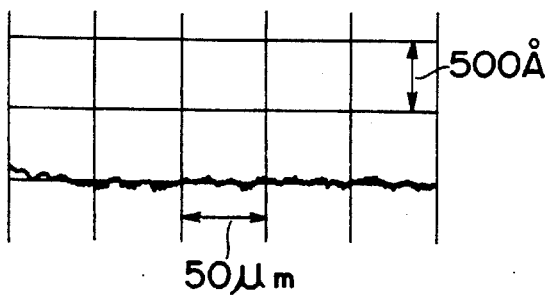
FIG. 2 is a figure explaining surface roughness of a substrate before electroetching.
Figure 3:
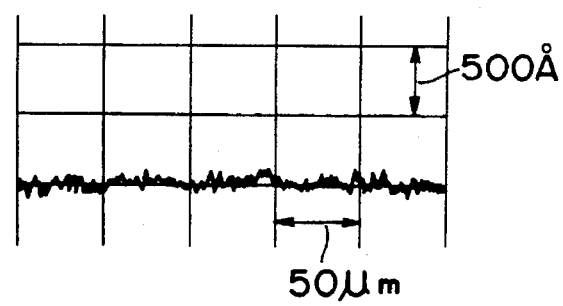
FIG. 3 is a figure explaining surface roughness of a substrate after electroetching (50 mA/cm$^2$, 1 minute).
Figure 4:
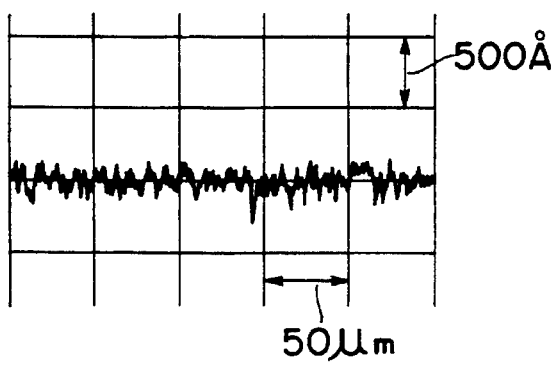
FIG. 4 is a figure explaining surface roughness of a substrate after electroetching (50 mA/cm$^2$, 5 minutes).

A substrate made of glassy carbon of 2.5 inches of diameter and 0.635 mm of thickness was prepared as below.

Five hundred parts by weight of furfuryl alcohol, 400 parts by weight of 92% paraformaldehyde and 30 parts by weight of water were stirred at 85° C. and taken into solution. Next, under stirring, the resulted solution was dropped by a mixed solution of 520 parts by weight of phenol, 9.5 parts by weight of calcium hydroxide and 45 parts by weight of water. After completion of dropping the mixed solution, reaction at 75° C. for 3 hours was followed.

Additionally, a solution of 80 parts by weight of phenol and above-mentioned phenol/calcium hydroxide/water was dropped and reacted at 85° C. for 2.0 hours. After cooled to 30° C., the solution was neutralized with 30% p-toluensulfonic acid solution, followed by dehydration under reduced pressure to remove 170 parts by weight of water, and added and mixed with 500 parts by weight of furfuryl alcohol, and insoluble matters in the resulted resin were filtered by a membrane filter. The quantity of water to be involved with the resin was measured and resulted to be 35% by weight.

Into 100 parts by weight of the resulted thermosetting resin, 3.5 parts by weight of the resulted resin of a mixed solution of 70 parts by weight of p-toluensulfonic acid, 20 parts by weight of water and 10 parts by weight of Cellosolve was added and sufficiently stirred, then injected into a disk-shaped mold of 2 mm thickness and deaerated in reduced pressure. Next, it was thermoset at 500° C. for 3 hours, additionally at 80° C. for 2 days.

Thus obtained thermosetting resin was put into a calcination reactor for organic matter after formed doughnut-shaped, followed by heated to 700° C. in the range of heating rate 2 to 5° C. per hour in nitrogen gas, additionally heated and calcinated to 1200° C. in the range of heating rate 5 to 20° C. per hour under vacuum of 0.5 mTorr, kept at the temperature for 2 hours and cooled. Thus, a substrate made of glass-like carbon was obtained.

This substrate made of glassy carbon was mirror-polished using abrasive grains of from #500 to #8000. and a substrate of which Ra was 8Å was obtained. Note that the density of the substrate made of glassy carbon was 1.5 g/cm$^3$ and half-width of (002) plane diffraction peak appeared in X-ray diffraction measurement near by the diffraction 2θ=20–30° C. was 3.9°. Also, according to an observation by a polarization microscope and a differential microscope, a number of defect greater than 3 μm is 0 piece/cm$^2$.

Substrate material 2

By the same way in [Substrate material 1], a substrate of which Ra=7Å, density=1.8 g/cm$^3$, half-width =2.6° and number of defect greater than 3 μm is 0 piece/cm$^2$ was obtained.

Substrate material 3

By the same way in [Substrate material 1], a substrate of which Ra=18Å, density=1.4 g/cm$^3$, half-width =4.6° and number of defect greater than 3 μm is 0 piece/cm$^2$ was obtained.

Substrate material 4

By the same way in [Substrate material 1], a substrate of which Ra=18Å, density=1.5 g/cm$^3$, half-width =3.9° and number of defect greater than 3 μm is 1.5 piece/cm$^2$ was obtained.

Substrate material 5

A Ni-P plated, of which thickness is 9 μm, Al substrate (produced by Nippon Light Metal Co., Ltd.) of 0.635 mm thickness and 2.5 inches diameter was prepared. Additionally, Ra and Rp of the substrate are 18Å and 42Å, respectively.

Electroetching

Electroetching was conducted for 30 to 300 seconds using an electrode made of glassy carbon under the conditions that current density was in the range from 10 to 100 mA/cm$^2$, voltage from 2 to 30 V, temperature of liquid from 25° to 30° C.

The surface profiles of the substrates processed as above are shown in Table-1.

It is to be noted that the surface was examined using the surface roughness measurement instrument P2 produced by Teacor, an interatom force microscope and a scanning electron microscope (SEM).

TABLE -1

| No. | A | B | C (mA/cm$^2$) | D (sec) | Ra (Å) | E Rp (Å) | Uniformity |
|---|---|---|---|---|---|---|---|
| 1 | H$_2$SO$_4$ 10% | DC | 25 | 120 | 35 | 155 | ○ |
| 2 | H$_2$SO$_4$ 10% | DC | 50 | 90 | 50 | 170 | ○ |
| 3 | H$_2$SO$_4$ 10% | AC | 50 | 90 | 55 | 160 | ○ |
| 4 | HNO$_3$ 10% | DC | 25 | 120 | 33 | 140 | ○ |
| 5 | HNO$_3$ 10% | AC | 50 | 90 | 45 | 172 | ○ |
| 6 | H$_2$CrO$_4$ 10% | DC | 25 | 120 | 28 | 120 | ○ |
| 7 | H$_2$CrO$_4$ 10% | DC | 50 | 90 | 35 | 143 | ○ |
| 8 | NAOH 10% | DC | 5 | 240 | 27 | 110 | ○ |
| 9 | NAOH 10% | DC | 25 | 120 | 40 | 160 | ○ |
| 10 | NAOH 10% | DC | 50 | 60 | 38 | 143 | ○ |
| 11 | NAOH 10% | DC | 50 | 120 | 45 | 165 | ○ |
| 12 | NAOH 10% | DC | 50 | 300 | 65 | 226 | ○ |
| 13 | NAOH 10% | DC | 100 | 30 | 74 | 247 | ○ |
| 14 | NAOH 10% | AC | 50 | 30 | 37 | 150 | ○ |
| 15 | NAOH 10% | 3PHW | 25 | 60 | 35 | 142 | ○ |
| 16 | KOH 10% | DC | 10 | 90 | 28 | 115 | ○ |
| 17 | KOH 10% | DC | 25 | 90 | 33 | 136 | ○ |
| 18 | KOH 10% | DC | 50 | 90 | 46 | 145 | ○ |
| 19 | KOH 10% | DC | 50 | 90 | 54 | 170 | ○ |
| 20 | HCl 10% | DC | 25 | 120 | 35 | 161 | ○ |
| 21 | NAOH 10% | DC | 25 | 120 | 28 | 120 | Δ |
| 22 | NAOH 10% | DC | 25 | 120 | 80 | 28 0 | ○ |
| 23 | HNO$_3$ 10% | DC | 25 | 120 | 35 | 145 | Δ |

A: Type of electrolyte,
B: Current waveform,
C: Current density,
D: Electrolysis time,
E: Surface characteristics after electroetching
[Note]
*The material of substrate used in No. 1 to No. 18 is glass-like carbon obtained in [Substrate material 1].
*The material of substrate used in No. 19 and No. 20 is Ni—P plated Al obtained in [Substrate material 5].
*The material of substrate used in No. 21 is glassy carbon obtained in [Substrate material 2].
*The material of substrate used in No. 22 is glassy carbon obtained in [Substrate material 3].
*The material of substrate used in No. 23 is glassy carbon obtained in [Substrate material 4].

Comparison 1

The surface of the substrate made of carbon obtained in above [Substrate material 1] was made rough by pushing an abrasive tape thereon instead of means in the above [Electroetching], a substrate of which surface profile was that Ra=50Å, Rp=150Å was obtained.

Comparison 2

The surface of the substrate made of carbon obtained in above [Substrate material 1] was made rough by pushing an abrasive tape thereon instead of means in the above [Electroetching], a substrate of which surface profile was that Ra=80Å, Rp=250Å was obtained.

Comparison 3

The very substrate made of carbon obtained in above [Substrate material 1] was prepared. The surface profile thereof was that Ra=18Å, Rp=60Å.

Film formation

A DC magnetron sputtering device was used under the conditions of Ar gas pressure 2 mTorr, substrate temperature 200° C. to provide a Cr undercoat of 50 nm thickness and a Co—Cr—Ta magnetic film of 70 nm thickness thereon.

Then, a protective layer made of carbon of 20 nm thickness was formed on the Co—Cr—Ta magnetic film, followed by applying perfluoropolyeter lubricant and drying it.

Figure 5:
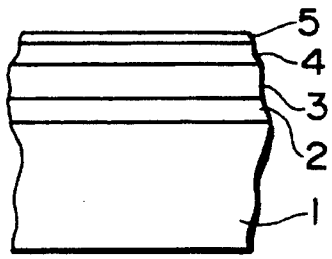
FIG. 5 is a schematic of a magnetic disk.

A schematic of the magnetic disk obtained as above is shown in FIG. 5. In this schematic, 1 is a substrate made of carbon, 2 is a Cr film, 3 is a Co—Cr—Ta magnetic film and 4 is a protective layer, 5 is a film of lubricant.

Characteristics

Durability test (CSS test. Number until reaching to friction factor=0.6 with load of 6 g), Gliding Height (GHT) characteristics (using RG-550 produced by Hitachi Denshi Engineering Ltd. Gliding height was set to 0.5 μm), Missing Error (with RC-560 produced by Hitachi Denshi Engineering Ltd. Write frequency was 5 MHz, gliding height was 0.075 μm) were examined for the magnetic disks of Examples 1 to 23 obtained as above. The result is shown in Table-2.

Additionally, the magnetic disks of comparisons 1 to 3 were also examined same as above. The result is shown in Table-3.

TABLE-2

| No | CSS test | GHT hit number | Missing errors within 20 bit |
|---|---|---|---|
| 1 | more than 20000 times | 0 pcs/plane | less than 30/one side |
| 2 | more than 20000 times | 0 pcs/plane | less than 30/one side |
| 3 | more than 20000 times | 0 pcs/plane | less than 30/one side |
| 4 | more than 20000 times | 0 pcs/plane | 30 to 100/one side |
| 5 | more than 20000 times | 0 pcs/plane | 30 to 100/one side |
| 6 | more than 20000 times | 0 pcs/plane | less than 30/one side |
| 7 | more than 20000 times | 0 pcs/plane | less than 30/one side |
| 8 | more than 20000 times | 0 pcs/plane | less than 30/one side |
| 9 | more than 20000 times | 0 pcs/plane | less than 30/one side |
| 10 | more than 20000 times | 0 pcs/plane | less than 30/one side |
| 11 | more than 20000 times | 0 pcs/plane | less than 30/one side |
| 12 | more than 20000 times | 0 pcs/plane | less than 30/one side |

TABLE-2-continued

| No | CSS test | GHT hit number | Missing errors within 20 bit |
|---|---|---|---|
| 13 | more than 20000 times | 0 pcs/plane | less than 30/one side |
| 14 | more than 20000 times | 0 pcs/plane | less than 30/one side |
| 15 | more than 20000 times | 0 pcs/plane | less than 30/one side |
| 16 | more than 20000 times | 0 pcs/plane | less than 30/one side |
| 17 | more than 20000 times | 0 pcs/plane | less than 30/one side |
| 18 | more than 20000 times | 0 pcs/plane | less than 30/one side |
| 19 | more than 20000 times | 0 pcs/plane | less than 30/one side |
| 20 | more than 20000 times | 0 pcs/plane | less than 30/one side |
| 21 | more than 20000 times | 0 pcs/plane | 100 to 200/one side |
| 22 | more than 20000 times | 6 pcs/plane | less than 30/one side |
| 23 | more than 20000 times | 0 pcs/plane | 100 to 200/one side |

TABLE-3

| No | CSS test | GHT hit number | Missing errors within 20 bit |
|---|---|---|---|
| 1 | 2000 times | 0 pcs/plane | more than 200/one side |
| 2 | 5000 times | 0 pcs/plane | more than 200/one side |
| 3 | 50 times | 0 pcs/plane | less than 30/one side |

These examination results show that the electroetched substrate have an excellent characteristics for a substrate of magnetic disk because they have appropriate and uniform surface roughness on the whole surface thereof.

What is claimed is:

1. A magnetic recording medium comprising a substrate and a magnetic film formed on said substrate, wherein said substrate is formed using a conductive material and a surface of said substrate is processed by electroetching, and wherein said substrate is made of a carbon material., said carbon material having a density in the range of 1.4 to 1.6 g/cm$^3$, a half-width of (002) plane diffraction peak in X-ray diffraction measurement of not less than 3°, and having a number of defects greater than a diameter of 3 μm of less than 1 piece/cm$^2$.

2. The magnetic recording medium according to claim 1, wherein said substrate being electroetched has Ra value in the range from 25 to 300Å and Rp/Ra value in the range from 2 to 6.

3. The magnetic recording medium according to claim 1, wherein said magnetic film is a metallic magnetic film.

4. A method of producing a magnetic recording medium comprising a substrate and a magnetic film formed on said substrate comprising:

a first step of electroetching a conductive substrate in an electrolytic solution; and a second step of forming a magnetic film on said substrate after said first step, wherein said substrate is made of a carbon material with a density in the range of from 1.4 to 1.6 g/cm$^3$, a half-width of (002) plane diffraction peak in X-ray diffraction measurement of not less than 3° and a number of defects greater than 3 μm of less than 1 piece/cm$^2$.

5. The method of producing a magnetic recording medium according to claim 4, wherein said electrolytic solution is an acid aqueous solution.

6. The method of producing a magnetic recording medium according to claim 4, wherein said electrolytic solution is an alkaline aqueous solution.

7. The method of producing a magnetic recording medium according to claim 4, wherein said substrate is made of a carbon material and an electrode used for electroetching is made of a carbon material.

8. The method of producing a magnetic recording medium according to claim 4, wherein said first step comprises an electroetching process by connecting said substrate with an anode.

9. The method of producing a magnetic recording medium according to claim 4, wherein current density at said electroetching is in the range from 1 to 200 mA/cm$^2$.

10. The method of producing a magnetic recording medium according to claim 4, wherein voltage at said electroetching is in the range from 1 to 100 V.

11. The method of producing a magnetic recording medium according to claim 4, wherein processing time of said electroetching is in the range from one second to one hour.

12. The method of producing a magnetic recording medium according to claim 4, wherein said first step comprises electroetching of said substrate in an electrolytic solution so as to make Ra value be in the range from 25 to 300Å and Rp/Ra value be in the range from 2 to 6.

* * * * *